United States Patent
Kurihara

(10) Patent No.: US 9,967,544 B2
(45) Date of Patent: May 8, 2018

(54) REMOTE MONITORING SYSTEM AND MONITORING METHOD

(71) Applicant: Hitachi, Ltd., Chiyoda-ku, Tokyo (JP)

(72) Inventor: Tsuneya Kurihara, Tokyo (JP)

(73) Assignee: Hitachi, Ltd., Tokyo (JP)

(*) Notice: Subject to any disclaimer, the term of this patent is extended or adjusted under 35 U.S.C. 154(b) by 182 days.

(21) Appl. No.: 14/901,757

(22) PCT Filed: Jul. 3, 2013

(86) PCT No.: PCT/JP2013/068284
§ 371 (c)(1),
(2) Date: Dec. 29, 2015

(87) PCT Pub. No.: WO2015/001635
PCT Pub. Date: Jan. 8, 2015

(65) Prior Publication Data
US 2016/0205379 A1   Jul. 14, 2016

(51) Int. Cl.
| | |
|---|---|
| *H04N 13/02* | (2006.01) |
| *H04N 5/247* | (2006.01) |
| *H04N 13/00* | (2018.01) |
| *H04N 13/04* | (2006.01) |
| *G06T 19/00* | (2011.01) |
| *H04N 7/18* | (2006.01) |
| *H04N 5/222* | (2006.01) |

(52) U.S. Cl.
CPC ........ *H04N 13/0239* (2013.01); *G06T 19/00* (2013.01); *H04N 5/2224* (2013.01); *H04N 5/247* (2013.01); *H04N 7/181* (2013.01); *H04N 13/004* (2013.01); *H04N 13/04* (2013.01)

(58) Field of Classification Search
CPC ...... H04N 13/04; H04N 5/2224; H04N 5/247; H04N 7/181; G06T 19/00
USPC .......................................................... 348/47
See application file for complete search history.

(56) References Cited

U.S. PATENT DOCUMENTS

2007/0035627 A1*  2/2007 Cleary ............ G08B 13/19608
                                                      348/159

FOREIGN PATENT DOCUMENTS

| JP | 10-42272 A | 2/1998 |
|---|---|---|
| JP | 2001-249633 A | 9/2001 |
| JP | 2002-269593 A | 9/2002 |
| JP | 2008-259154 A | 10/2008 |

(Continued)

OTHER PUBLICATIONS

English translation of JP 2012124839, Jun. 2012, Morisawa.*
(Continued)

*Primary Examiner* — Jamie Atala
*Assistant Examiner* — Kathleen Nguyen
(74) *Attorney, Agent, or Firm* — Crowell & Moring LLP

(57) ABSTRACT

A remote monitoring system includes: a display unit on which a CG video generated from a three-dimensional CG model is displayed; an input unit which accepts a user's input to the CG video; a three-dimensional CG image generation unit which displays, on the display unit, the CG video after being moved on the basis of the input; an optimal camera calculation unit which specifies a surveillance camera that can pick up a real video similar to the CG video after being moved; and a control unit which controls the surveillance camera that is specified, wherein a real video from the surveillance camera that is controlled is displayed on the display unit.

10 Claims, 9 Drawing Sheets

(56) References Cited

FOREIGN PATENT DOCUMENTS

| JP | 2010-200167 A | | 9/2010 |
|---|---|---|---|
| JP | 2012-124839 A | | 6/2012 |
| JP | 2012124839 | * | 6/2012 |

OTHER PUBLICATIONS

International Search Report (PCT/ISA/210) issued in PCT Application No. PCT/JP2013/068284 dated Aug. 27, 2013 with English translation (five pages).
Japanese-language Written Opinion (PCT/ISA/237) issued in PCT Application No. PCT/JP2013/068284 dated Aug. 27, 2013 (four pages).
Japanese-language Office Action issued in counterpart Japanese Application No. 2015-524966 dated Jan. 24, 2017 (Four (4) pages).

* cited by examiner

FIG. 2

| VIRTUAL CAMERA POSITION (x,y,z) | VIRTUAL CAMERA DIRECTION ($\theta_x, \theta_y, \theta_z$) | VIRTUAL CAMERA ANGLE OF VIEW ($\theta_a$) |
|---|---|---|
| 3.24, 5.21, 0.45 | 34.1, 45.0, 5.7 | 35.3 |

FIG. 3

| SURVEILLANCE CAMERA ID | SURVEILLANCE CAMERA POSITION (x,y,z) | SURVEILLANCE CAMERA INSTALLATION DIRECTION ($\theta_x, \theta_y, \theta_z$) | PAN ANGLE, TILT ANGLE, ZOOM MAGNIFICATION ($\theta_p, \theta_t, F_z$) | CAMERA RATED VALUE |
|---|---|---|---|---|
| 1 | 3.24, 5.21, 0.45 | 20, -10, 7 | 20, -10, 4.5 | 36, -170~170, -90~25, 1~40 |
| 2 | 6.2, 100, 20.1 | 10, -10, 9 | 30, -10, 1 | 36, -170~170, -90~25, 1~40 |
| 3 | 50, 10, 80 | 0, -10, 10 | -20, -10, 2 | 36, -170~170, -90~25, 1~40 |
| 4 | 10, 50, 20 | 34.1, 45.0, 5.7 | -80, 0, 1 | 36, -170~170, -90~25, 1~40 |

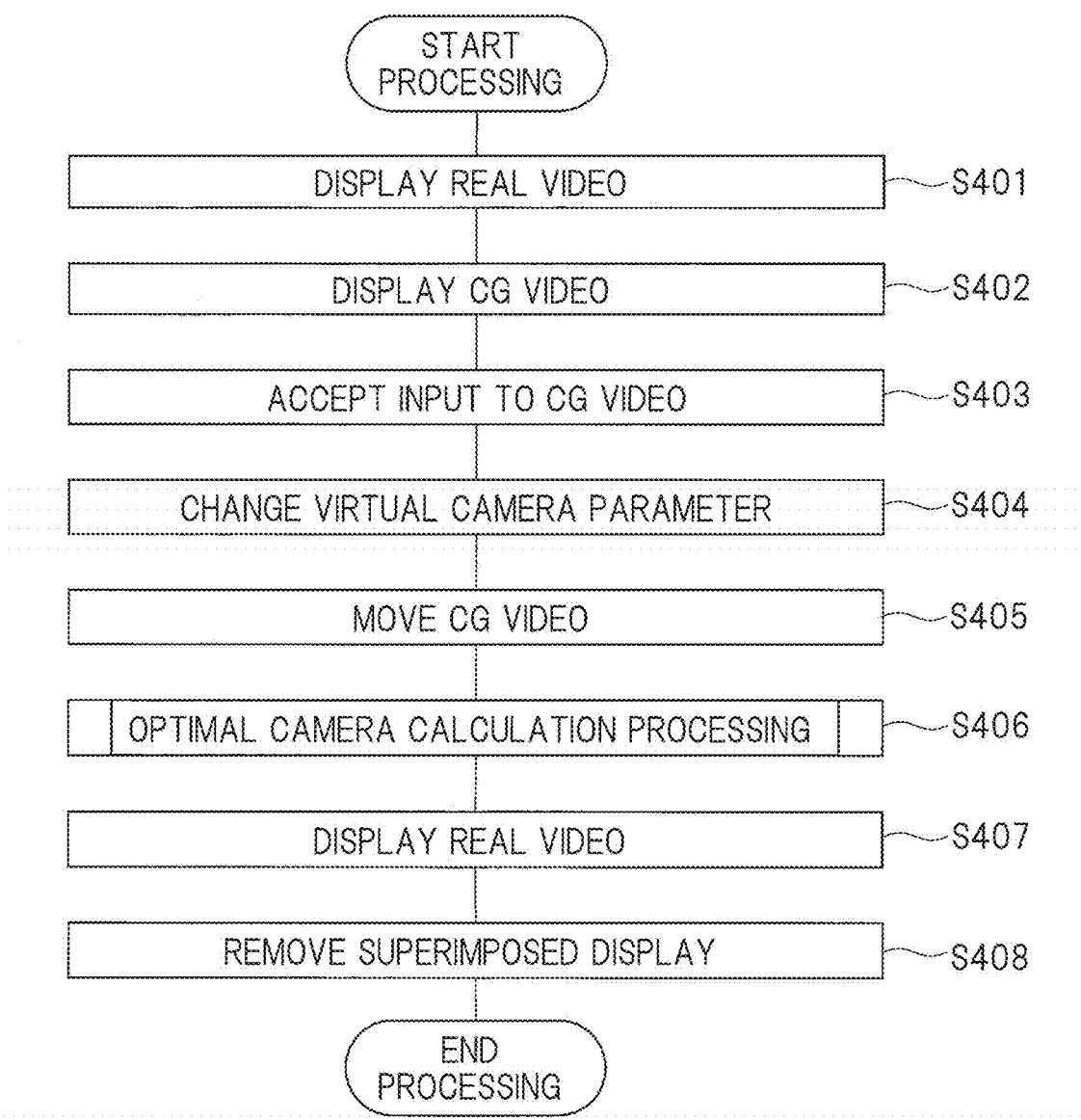

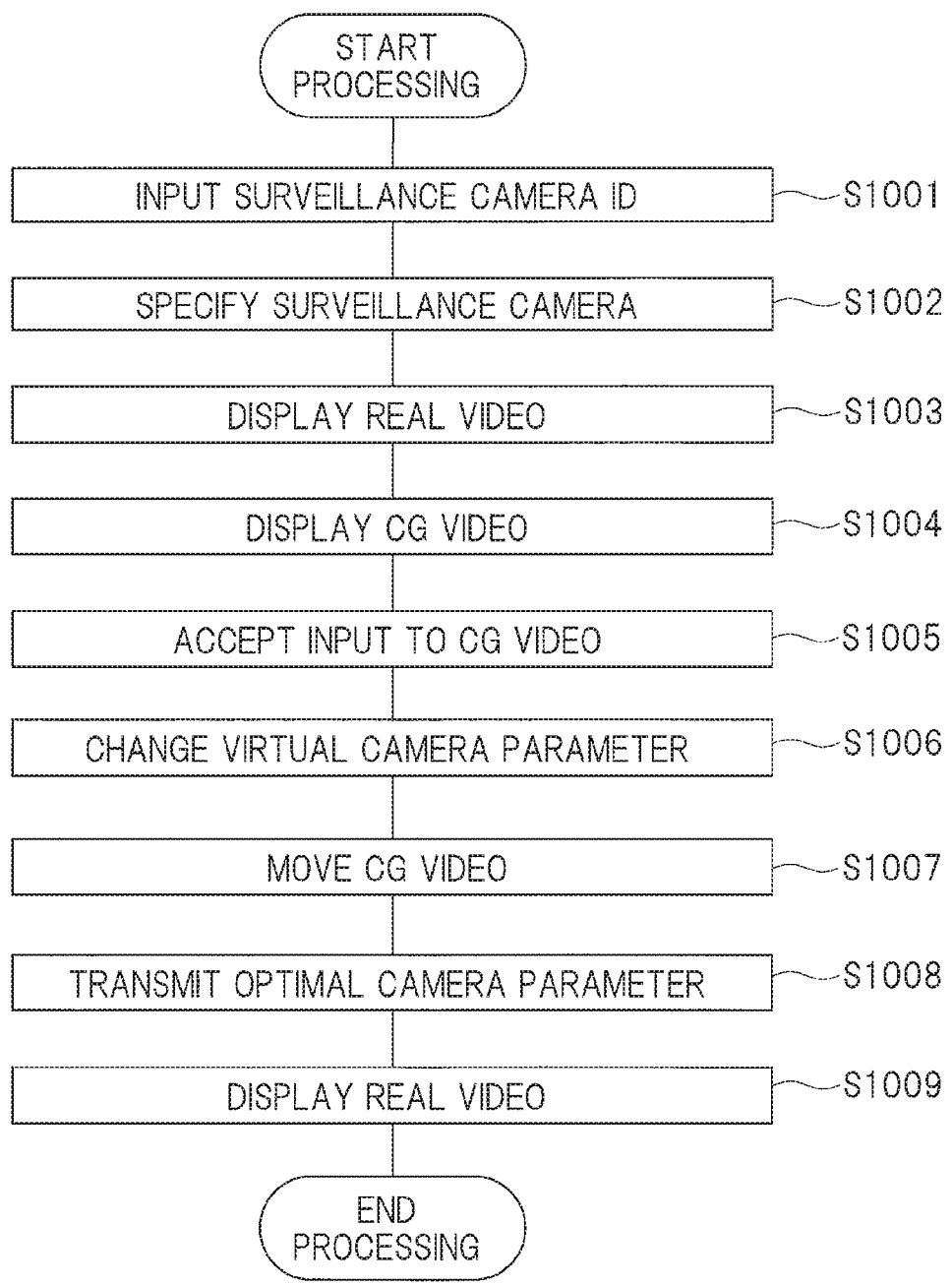

REMOTE MONITORING SYSTEM AND MONITORING METHOD

TECHNICAL FIELD

The present invention relates to a remote monitoring system and a monitoring method.

BACKGROUND ART

In a broad range of fields such as crime prevention systems, disaster prevention systems, on-site supervision systems and medical services, remote monitoring systems for observing the state of affairs from a place different from the site regardless of whether it is at a long distance or short distance are used. In a remote monitoring system, a large number of surveillance cameras are controlled via a network and incoming images are selectively displayed to the user, thus enabling efficient observation. In many cases, surveillance cameras can be controlled in terms of pan angle, tilt angle and zoom magnification, and the user can acquire desired videos. In this case, the user often uses a method of directly controlling the pan angle, tilt angle and zoom magnification while viewing images from surveillance cameras. In such direction control on the surveillance cameras, videos may be delayed because of a delay in the operations of the surveillance cameras or a delay on the network, thus posing the problem that it is difficult to direct surveillance cameras toward the place to be observed.

Moreover, the remote monitoring system as described above has the problem that it is hard to learn which way the user is looking. This is conspicuous in the case where the number of surveillance cameras is increased and where the user can control the pan angle, tilt angle and zoom magnification of the surveillance cameras. Although there is a method of displaying the positions and directions of surveillance cameras on a two-dimensional drawing, the actual site is a three-dimensional space and therefore hard to depict as two-dimensional. Unless the observer is an experienced and skilled person, it is difficult to image from where to where at the site is observed.

PTL 1 is a method for controlling a surveillance camera for remote monitoring. PTL 1 discloses a method using a sensing device such as a sensor. This method utilizes a three-dimensional virtual space. A three-dimensional virtual space model of the site is prepared in advance, and the positions of sensing devices, and the positions, lines of sight and angle-of-view areas of surveillance cameras are three-dimensionally displayed in real time in the three-dimensional space, thus showing where the area whose image is currently being picked up is located.

CITATION LIST

Patent Literature

[PTL 1] JP-A-2008-259154

SUMMARY OF INVENTION

Technical Problem

With the technique disclosed in PTL 1, though where the area whose image is currently being picked up is located can be shown using the three-dimensional virtual space, the surveillance cameras themselves cannot be interactively controlled.

An object of the invention is to make it easier to select a surveillance camera that can pick up an image that the user wants to see, by using CG video.

Solution to Problem

The summary of representative examples of the invention disclosed in the present application is briefly described as follows.

An embodiment of the invention includes a display unit on which a CG video generated from a three-dimensional CG model is displayed. The embodiment also includes an input unit which accepts a user's input to the CG video. Moreover, the embodiment includes a three-dimensional CG image generation unit which displays, on the display unit, the CG video after being moved on the basis of the input. The embodiment also includes an optimal camera calculation unit which specifies a surveillance camera that can pick up a real video similar to the CG video after being moved. The embodiment also includes a control unit which controls the surveillance camera that is specified. Also, a real video from the surveillance camera that is controlled is displayed on the display unit.

Another embodiment includes a CG video display step of preparing in advance the three-dimensional CG model of the real world including a position and direction of a surveillance camera, and displaying a CG video generated from the three-dimensional CG model. The embodiment also includes an input step of accepting a user's input to the CG video. The embodiment also includes a movement step of moving the CG video on the basis of the input accepted from the user. The embodiment also includes a control step of specifying the surveillance camera that can pick up a real video similar to the CG video after being moved, and controlling the surveillance camera that is specified. The embodiment also includes a real video display step of displaying the real video from the surveillance camera that is controlled.

Advantageous Effect of Invention

The advantageous effect of the representative examples of the invention disclosed in the present application is briefly described as follows.

According to an embodiment, it is easier to select a camera that can pick up an image that the user wants to see.

BRIEF DESCRIPTION OF DRAWINGS

FIG. 2 is a view showing an example of configuration of virtual camera parameters in the remote monitoring system according to Embodiment 1 of the invention.

FIG. 3 is a view showing an example of configuration of a surveillance camera installation data stored in a surveillance camera installation data storage unit in the remote monitoring system according to Embodiment 1 of the invention.

FIG. 4 is a view showing an outline of overall processing in the remote monitoring system according to Embodiment 1 of the invention.

FIGS. 5A-5E are views showing an example of videos displayed on a display unit in the remote monitoring system according to Embodiment 1 of the invention, wherein FIG. 5A shows an example of a real video, FIG. 5B shows an example in which a CG video is displayed as superimposed on the real video, FIG. 5C shows an example in which the CG video after being moved is displayed as superimposed on the real video, FIG. 5D shows an example in which the CG video after being moved is displayed as superimposed on a real video from a specified surveillance camera, and FIG. 5E shows an example in which the superimposed display of the CG video after being moved is removed from the real video from the specified surveillance camera.

FIGS. 8A AND 8B are views for explaining another method for setting a point of interest in the remote monitoring system according to Embodiment 1 of the invention, wherein FIG. 8A shows a CG video and FIG. 8B shows an example of a bird's-eye-view CG video.

FIG. 10 is a view showing an outline of overall processing in a remote monitoring system according to Embodiment 2 of the invention.

DESCRIPTION OF EMBODIMENTS

Hereinafter, embodiments of the invention will be described in detail on the basis of the drawings. In all the drawings for explaining the embodiments, the same parts are denoted by the same reference signs and repetition of the description of these parts is omitted.

In a remote monitoring system according to Embodiment 1 of the invention, real videos picked up by surveillance cameras are displayed, and CG videos that express the same videos as the displayed real videos are displayed as superimposed on the real videos. Then, a user's input to a CG video is accepted and the CG video is moved. A surveillance camera that can pick up an image similar to the CG video after being moved is specified, and the video from the specified surveillance camera is displayed. Thus, the surveillance cameras can be interactively controlled so as to pick up an image that the user wants to see.

Embodiment 1

Embodiment 1 of the invention will be described using FIGS. 1 to 9.
<System Configuration>

Figure 1:
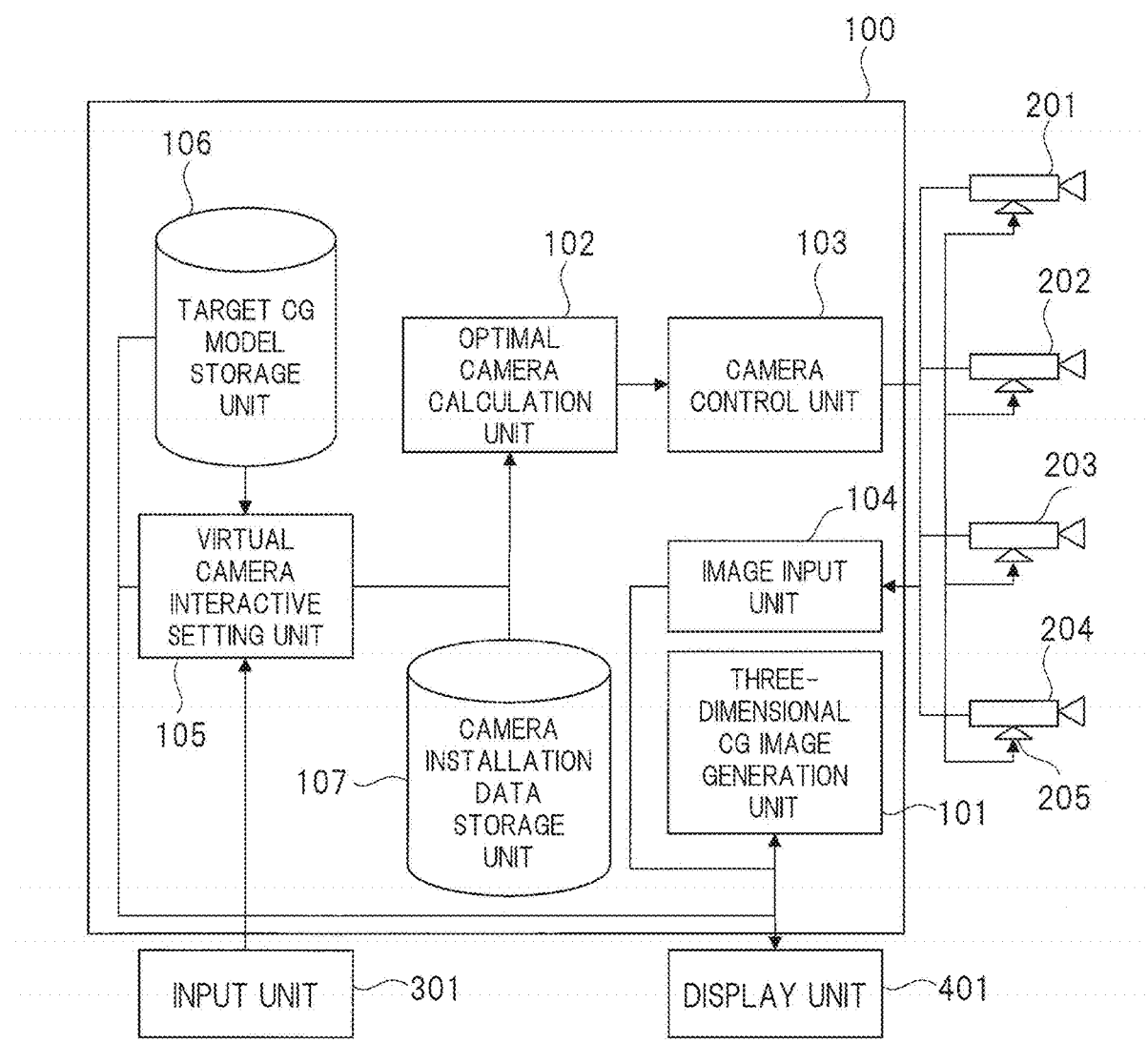
FIG. 1 is a view showing an outline of an example of configuration of a remote monitoring system according to Embodiment 1 of the invention.

FIG. 1 is a view showing an outline of an example of configuration of a remote monitoring system according to Embodiment 1 of the invention. In FIG. 1, the remote monitoring system includes: a remote monitoring system control unit 100; a plurality of surveillance cameras 201 to 204 connected to the remote monitoring system control unit 100; control units 205 which control these surveillance cameras 201 to 204 (for example, mechanisms for controlling the directions of the surveillance cameras 201 to 204); an input unit 301; and a display unit 401.

Also, the computer of the remote monitoring system control unit 100 is implemented by predetermined hardware and software. For example, the remote monitoring system control unit 100 has a processor, a memory and the like, and the program on the memory is executed by the processor.

The remote monitoring system control unit 100 includes a three-dimensional CG image generation unit 101, an optimal camera calculation unit 102, a camera control unit 103, an image input unit 104, a virtual camera interactive setting unit 105, a target CG model storage unit 106, and a surveillance camera installation data storage unit 107.

The target CG model storage unit 106 stores a three-dimensional CG model that is a three-dimensional virtual space depicting the real world.

The three-dimensional CG image generation unit 101 acquires the three-dimensional CG model from the target CG model storage unit 106. Also, the three-dimensional CG image generation unit 101 receives virtual camera parameters (described below, FIG. 2) that are parameters of a virtual camera which picks up an image of a target three-dimensional CG model, from the virtual camera interactive setting unit 105. Then, the three-dimensional CG image generation unit 101 generates a CG video on the basis of the acquired three-dimensional CG model and the received virtual camera parameters, and displays the generated CG video on the display unit 401.

An input accepted from the input unit 301 is interpreted by the virtual camera interactive setting unit 105, and the virtual parameters are changed by the virtual camera interactive setting unit 105. Then, the virtual camera parameters after the change are transmitted to the three-dimensional CG image generation unit 101 by the virtual camera interactive setting unit 105. Subsequently, the three-dimensional CG image generation unit 101 generates a CG video on the basis of the acquired three-dimensional CG model and the received virtual camera parameters after the change, and displays the generated CG video on the display unit 401. Thus, on the basis of the input accepted by the input unit 301, the CG video is interactively moved from the CG video displayed on the basis of the three-dimensional CG model and the virtual camera parameters before the change, to the CG video displayed on the basis of the three-dimensional CG model and the virtual camera parameters after the change.

As the input unit 301, an input device such as a joystick, keyboard or mouse is applicable. Also, various known techniques can be used for setting the above virtual camera parameters. For example, the virtual camera may be interactively controlled by changing the virtual camera parameters via an arc ball or trackball which virtually rotates an object and then moving the CG video on the basis of the virtual camera parameters after the change. Also, the position and direction of the virtual camera may be changed using a walk-through or fly-through technique. Moreover, the position of the virtual camera, the position of a point of interest, described below, and the up vector of the virtual camera or the like may be interactively changed.

The surveillance cameras 201 to 204 pick up real videos that are videos formed by picking up images of the real world, and transmit the real videos that are picked up to the image input unit 104 in real time.

Here, as the virtual camera parameters of the virtual camera, any camera position, camera direction and camera angle of view can be set, whereas the surveillance cameras 201 to 204 installed in the space in reality are limited in camera position, camera direction and camera angle of view that can be set. Therefore, the optimal camera calculation unit 102 specifies the surveillance cameras 201 to 204 that can pick up a real video similar to the CG video after being moved, picked up by the virtual camera, on the basis of the virtual camera parameters and surveillance camera installation data (described below, FIG. 3). Subsequently, the optimal camera calculation unit 102 calculates a pan angle, a tilt angle and a zoom magnification that are optimal for picking up a real video similar to the CG video picked up by the virtual camera with respect to the specified surveillance cameras 201 to 204, as optimal camera parameters.

The camera control unit 103 sets the pan angle, the tilt angle and the zoom magnification in the control units 205 of the surveillance cameras 201 to 204, using the optimal camera parameters. The control units 205 control the surveillance cameras 201 to 204 on the basis of the set values. Subsequently, the real videos picked up by the surveillance cameras 201 to 204 are displayed on the display unit 401 via the image input unit 104.

The three-dimensional CG model stored in the target CG model storage unit 106 is a three-dimensional CG model depicting the real world as a target of surveillance or observation and includes information of the positions and directions of the surveillance cameras 201 to 204. Also, the three-dimensional CG model can be interactively produced, using three-dimensional CG software. Meanwhile, if CAD information (for example, DXF file) is available, the three-dimensional CG model may be generated from the CAD information. Also, the three-dimensional CG model may be three-dimensionally measured with a laser range finder or the like. Moreover, the three-dimensional CG model may be reconfigured from a plurality of photographs.

<Virtual Camera Parameters>

FIG. 2 is a view showing an example of configuration of virtual camera parameters in the remote monitoring system according to Embodiment 1 of the invention.

In FIG. 2, the virtual camera parameters include data items such as [virtual camera position], [virtual camera direction] and [virtual camera angle of view].

The [virtual camera position] expresses the coordinates for specifying the position of the virtual camera and is made up of x-coordinate, y-coordinate and z-coordinate.

The [virtual camera direction] expresses the direction of the virtual camera when the pan angle and the tilt angle, which are rotation components about each axis, are 0, and is made up of tilt angle $\theta_x$, pan angle $\theta_y$ and roll angle $\theta_z$.

The [camera angle of view] expresses the angle of view $\theta_a$ of the camera.

<Surveillance Camera Installation Data>

FIG. 3 is a view showing an example of configuration of the surveillance camera installation data stored in the surveillance camera installation data storage unit 107.

The surveillance camera installation data stored in the surveillance camera installation data storage unit 107 includes data items such as [surveillance camera ID], [surveillance camera position], [surveillance camera installation direction], [pan angle, tilt angle, zoom magnification] and [camera rated value].

The [surveillance camera position] expresses the coordinates for specifying the positions of the surveillance cameras 201 to 204 and is made up of x-coordinate, y-coordinate and z-coordinate.

The [surveillance camera installation direction] expresses the directions of the surveillance cameras 201 to 204 when the pan angle and the tilt angle, which are rotation components about each axis, are 0, and is made up of tilt angle $\theta_x$, pan angle $\theta_y$ and roll angle $\theta_z$.

[pan angle $\theta_p$] expresses the pan angle of the surveillance camera. [tilt angle $\theta_t$] expresses the tilt angle of the surveillance camera.

[zoom magnification $f_z$] expresses the value of zoom magnification.

The [camera rated value] expresses the angle of view of the camera when the zoom magnification is 1, and ranges in which the tilt angle $\theta_t$, the pan angle $\theta_p$ and the zoom magnification can be controlled.

The actual direction of the surveillance camera is the above [surveillance camera installation direction] with the [pan angle $\theta_p$] and the [tilt angle $\theta_t$] combined.

<Overall Processing>

FIG. 4 is a view showing an outline of overall processing in the remote monitoring system according to Embodiment 1 of the invention.

Figure 5A:
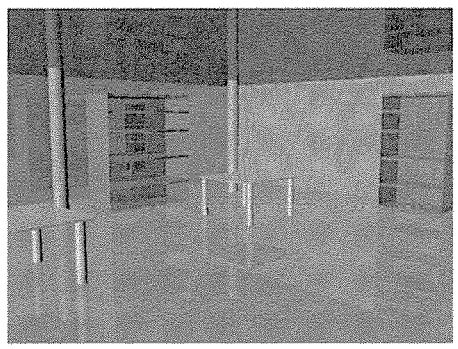

First, in S401, a real video picked up by the surveillance cameras 201 to 204 is displayed on the display unit 401, as shown in FIG. 5(a).

Figure 5B:
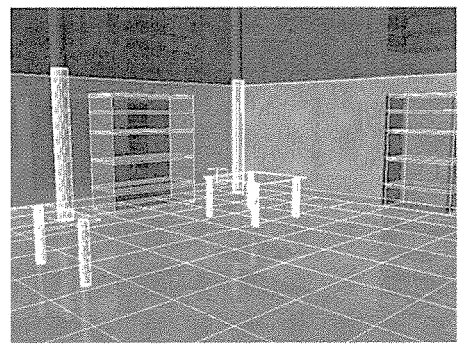

Next, in S402, the three-dimensional CG image generation unit 101 generates a CG video on the basis of virtual camera parameters having the same values as the surveillance camera installation data of the surveillance cameras 201 to 204 and the three-dimensional CG model, displays the generated CG video as superimposed on the real video, as shown in FIG. 5(b).

Here, the CG video shown in FIG. 5(b) is expressed with wire frames. The CG video may be expressed with three-dimensional surfaces. Also, instead of displaying the CG video as superimposed on the real video, the CG video and the real video may be displayed in separate windows, using a multi-window function. Moreover, the CG video may be displayed alone on the display unit 401. In this case, the CG video is hidden after being moved, and subsequently a real video picked up by the surveillance cameras 201 to 204 that are controlled is displayed on the display unit 401.

Next, in S403, the input unit 301 accepts an input to the CG video displayed on the display unit 401.

Next, in S404, the virtual camera interactive setting unit 105 changes virtual camera parameters on the basis of the input accepted in S403. Subsequently, the virtual camera interactive setting unit 105 transmits the changed virtual camera parameters to the three-dimensional CG image generation unit 101.

Figure 5C:
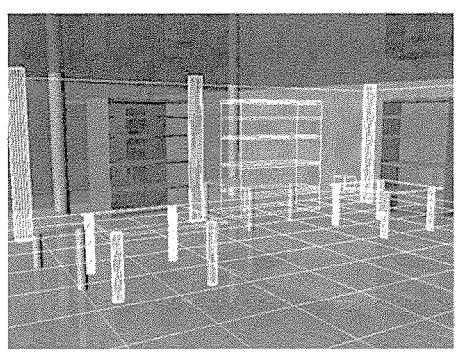

Next, in S405, the three-dimensional CG image generation unit 101 generates a CG video on the basis of the virtual camera parameters after being changed in S404 and the three-dimensional CG model and displays the CG video moved from the state of FIG. 5(b) as superimposed on the real video on the display unit 401, as shown in FIG. 5(c). In the example of FIG. 5(c), the pan angle $\theta_y$, of the virtual camera parameters, is changed and therefore the virtual camera is panned in the left direction. In this case, the CG video is moved in the right direction, which is the opposite direction of the panning of the virtual camera.

Next, in S406, optimal camera specifying processing (described below, FIG. 6) is performed. The surveillance cameras 201 to 204 that can pick up a real video similar to the CG video after being moved, picked up by the virtual camera, are specified, and optimal camera parameters for the specified surveillance cameras 201 to 204 to pick up a real video similar to the CG video picked up by the virtual camera are calculated.

Figure 5D:
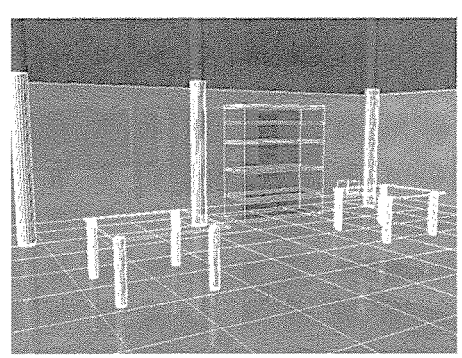

Next, in S407, the camera control unit 103 sets the optimal camera parameters in the control units 205 of the surveillance cameras 201 to 204 specified by the optimal camera calculation unit 102. The control units 205 control the pan angles $\theta_p$, tilt angles $\theta_t$ and zoom magnifications $f_z$ of the surveillance cameras 201 to 204 on the basis of the optimal camera parameters that are set. Subsequently, the surveillance cameras 201 to 204 controlled by the control units 205 pick up a real video. On the display unit 401, the real video picked up by the controlled surveillance cameras 201 to 204 is displayed and the CG video after being moved is displayed as superimposed on this real video, as shown in FIG. 5(d).

Figure 5E:
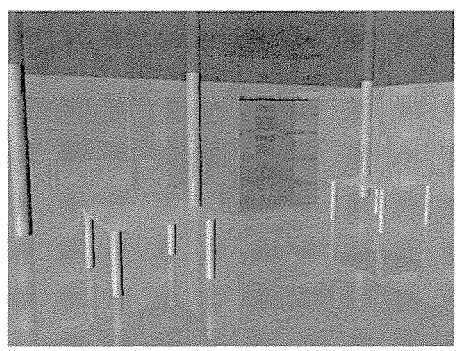

Finally, in S408, the three-dimensional CG image generation unit 101 ends the processing of displaying the CG video, and the superimposed display of the CG video on the real video is removed, as shown in FIG. 5(e).

However, in many cases, the actual surveillance cameras 201 to 204 cannot pick up a real video which coincides with the generated CG video. In such cases, surveillance camera parameters of the surveillance cameras 201 to 204 after being controlled may be applied as the virtual camera parameters of the CG video after being moved on the basis of the user's input. More specifically, the virtual camera interactive setting unit 105 applies optimal camera parameters as the virtual camera parameters at the point when the input accepted from the user ends (for example, a dragging of the mouse ends) and the processing of moving the CG video thus ends. Subsequently, the three-dimensional CG image generation unit 101 generates a CG video on the basis of the new virtual camera parameters and the three-dimensional CG model, and displays the generated CG video on the display unit 401. In this case, with an animation function, the virtual camera parameters may be gradually modified to the optimal camera parameters so that the CG video is displayed every time a modification is made.

<Optimal Camera Calculation Processing>

Figure 6:
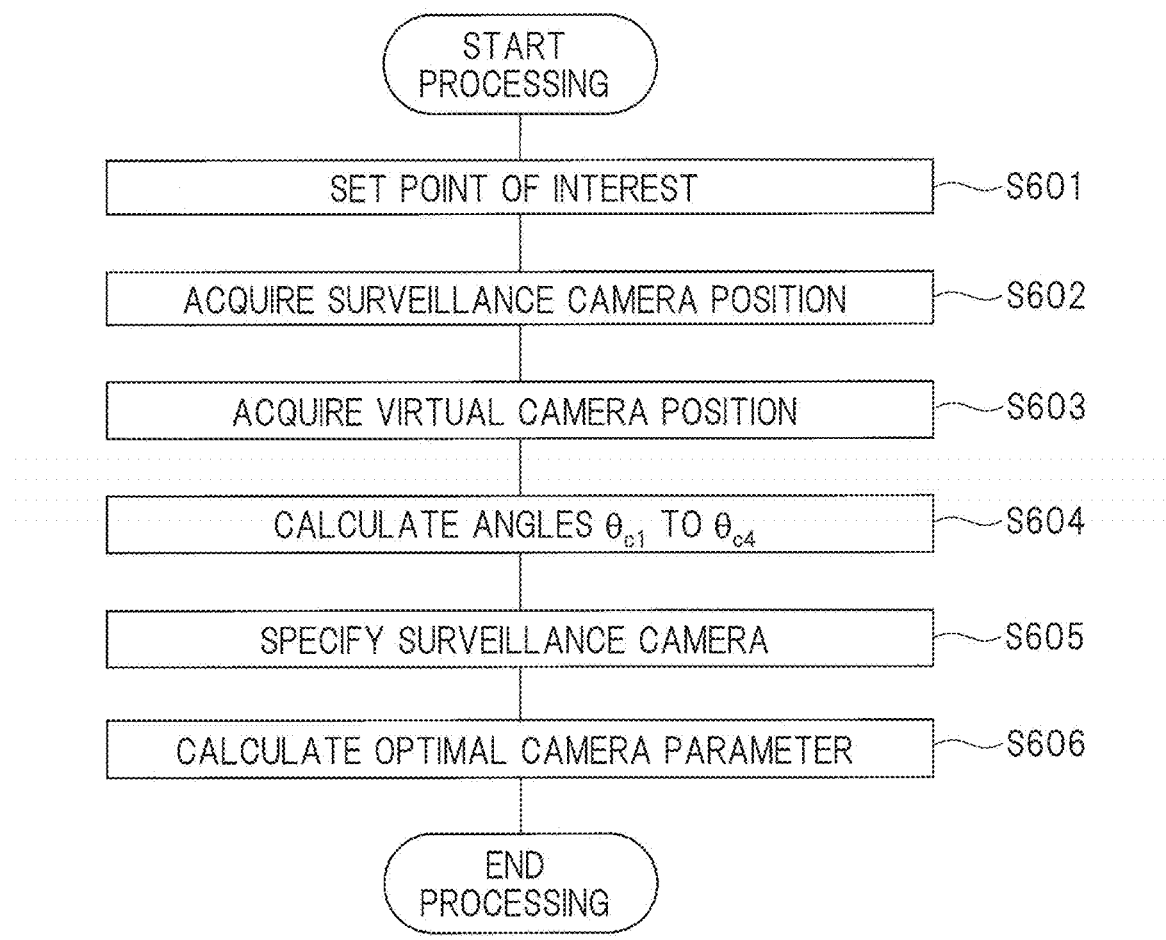
FIG. 6 shows an outline of optimal camera calculation processing in the remote monitoring system according to Embodiment 1 of the invention.

FIG. 6 shows an outline of optimal camera calculation processing in the remote monitoring system according to Embodiment 1 of the invention. In the optimal camera calculation processing, the position of a point that the user wants to check (hereinafter referred to as a point of interest) is set in S601, and the surveillance cameras 201 to 204 are specified in S602 to S605. Optical camera parameters are calculated in S606.

First, in S601, a point of interest is set on a CG video after being moved. Hereinafter, a method for setting a point of interest 700 is described, using FIG. 7 and FIG. 8.

Figure 7:
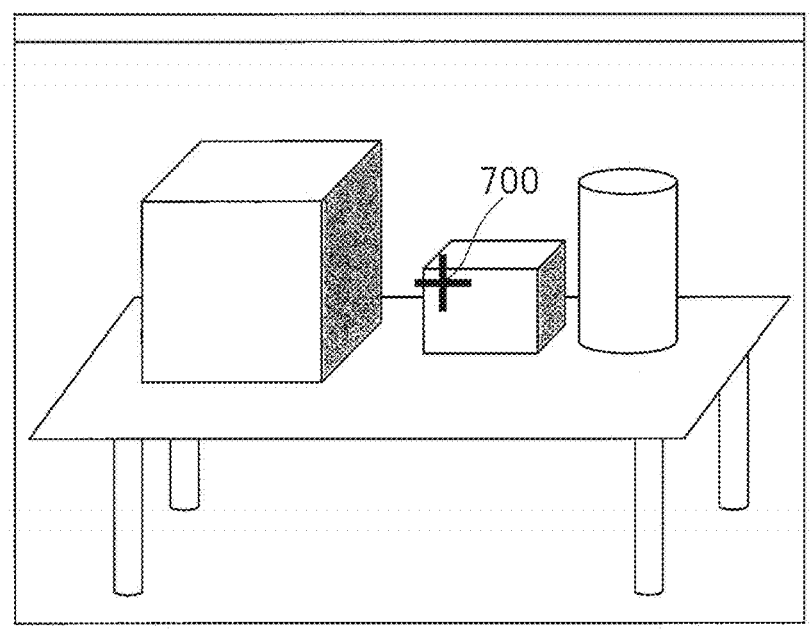
FIG. 7 is a view for explaining a method for setting a point of interest in the remote monitoring system according to Embodiment 1 of the invention.

FIG. 7 is a view for explaining a method for the user to set a point of interest in the remote monitoring system according to Embodiment 1 of the invention.

In the example of FIG. 7, the center point of a CG image after being moved is set as a point of interest 700. Here, since the CG image is a two-dimensional image, the x-coordinate and y-coordinate can be acquired but information of the coordinate in the depth direction (z-coordinate) is missing. Thus, in the example of FIG. 7, the coordinate in the depth direction of the outermost surface of the object displayed in the CG image (this object is a desk, chair or the like, for example) is used as the coordinate in the depth direction of the point of interest 700. Also, by using a three-dimensional CG model for displaying the CG image, it is possible to acquire the coordinate in the depth direction of the center of the CG image. At this time, if no object exists at the center of the CG image, an error indication may be shown and an input for setting the point of interest 700 may be accepted from the user.

Figure 8A:
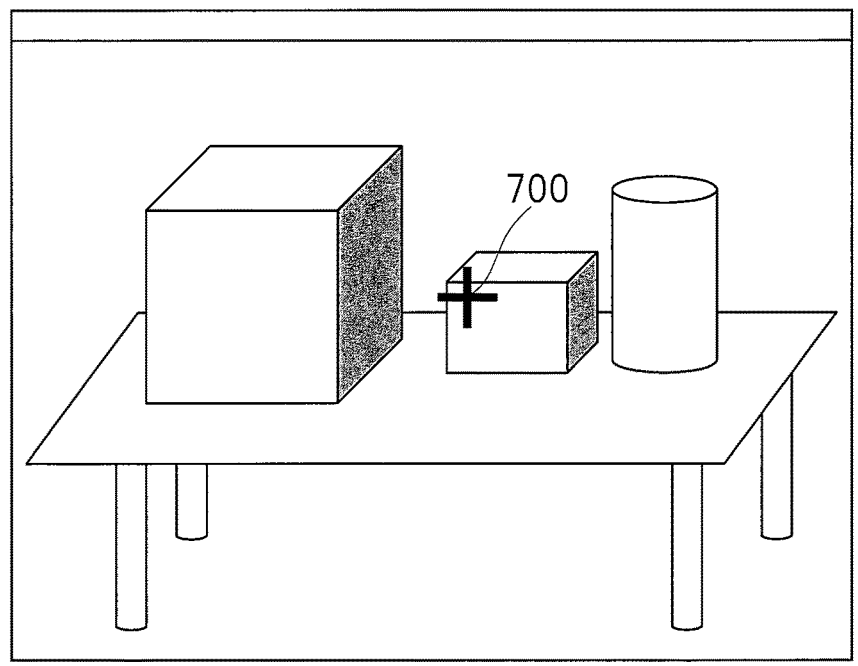
Figure 8B:
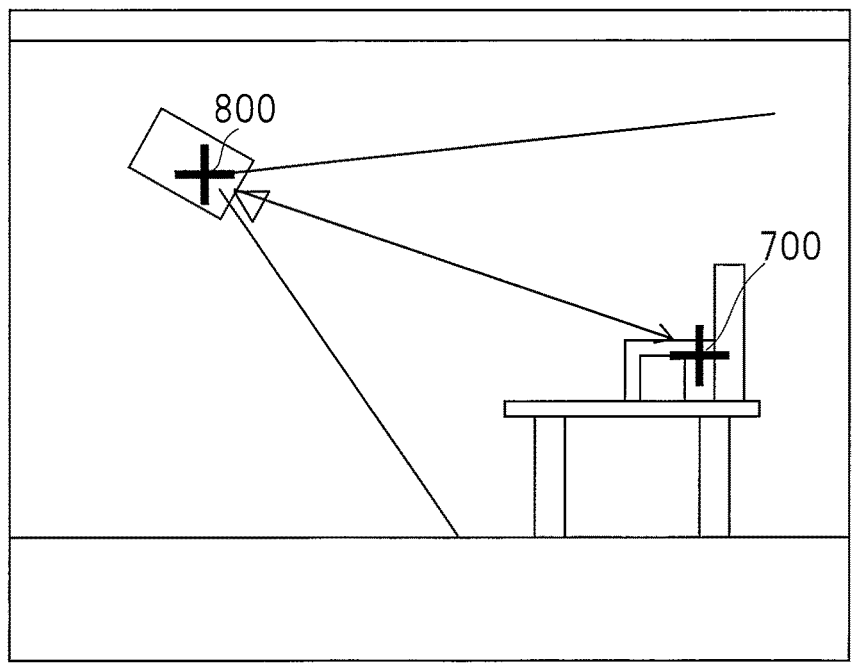

FIG. 8 is a view for explaining another method for setting the point of interest 700 in the remote monitoring system according to Embodiment 1 of the invention. FIG. 8(a) is a view showing a CG video. FIG. 8(b) is a view showing an example of a bird's-eye-view CG video. The display unit 401 displays a CG video and a bird's-eye-view CG video in separate windows, using a multi-window function. Then, the user can give an input to set the point of interest 700 and a virtual camera position 800 via the image input unit 104, while checking the bird's-eye-view CG video. As the image input unit 104 accepts the input to set the virtual camera position 800 or the position of the point of interest 700 from the user, the CG image is moved in real time according to the set content.

As the method for setting the point of interest 700, known techniques as well as the above method can be applied according to need.

Next, in S602, the optimal camera calculation unit 102 acquires the [surveillance camera position] from the surveillance camera installation data storage unit 107.

Next, in S603, the optimal camera calculation unit 102 acquires the [virtual camera position] of the virtual camera parameters from the virtual camera interactive setting unit 105.

Figure 9:
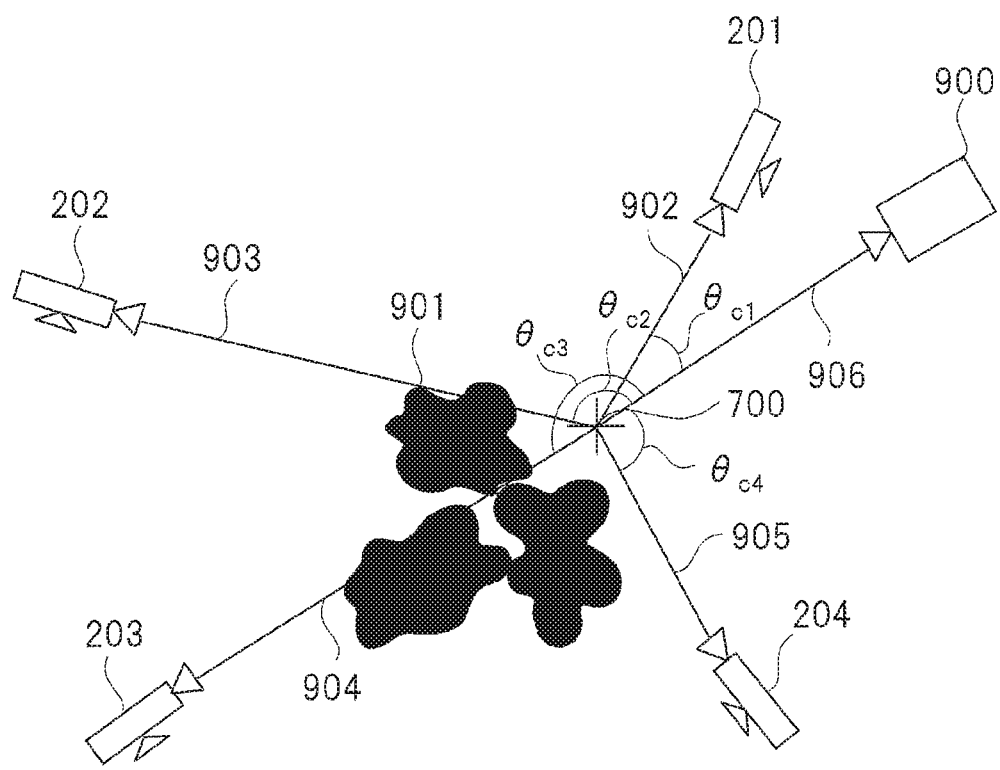
FIG. 9 is a view for explaining processing of specifying a surveillance camera in the optimal camera calculation processing in the remote monitoring system according to Embodiment 1 of the invention.

Hereinafter, the processing in S604 will be described, using FIG. 9. In FIG. 9, the point of interest 700 is set on a target three-dimensional CG model 901.

In S604, the optimal camera calculation unit 102 calculates angles $\theta_{c1}$ to $\theta_{c4}$ formed by straight lines 902 to 905 connecting the [surveillance camera positions] of the respective surveillance cameras 201 to 204 to the point of interest 700 and a straight line 906 connecting the [virtual camera position] to the point of interest 700, for each of the surveillance cameras 201 to 204.

Also, the angles $\theta_{c1}$ to $\theta_{c4}$ may be calculated on the basis of the directions of the respective surveillance cameras in the case where the surveillance cameras 201 to 204 face the direction of the point of interest 700 and the [virtual camera direction] of the virtual camera parameters.

Meanwhile, if the surveillance cameras 201 to 204 cannot face the direction of the point of interest 700, the angles $\theta_{c1}$ to $\theta_{c4}$ may be calculated on the basis of the directions of the surveillance cameras in the case of facing a direction that is as close to the direction of the point of interest as possible, and the [virtual camera direction] of the virtual camera parameters.

Also, if the point of interest 700 is not included in the ranges whose images are picked up by the respective surveillance cameras 201 to 204, the optimal camera calculation unit 102 may determine that there is no surveillance camera 201 to 204 that can pick up an image of the point of interest 700, and subsequently an error indication may be shown on the display unit 401. In this case, to determine whether there is a surveillance camera 201 to 204 that can pick up an image of the point of interest 700 or not, the optimal camera calculation unit 102 determines whether the point of interest 700 is included in the ranges whose images can be picked up by the respective surveillance cameras 201 to 204 or not, and if not included, determines that there is no surveillance camera 201 to 204 that can pick up such an image.

Next, in S605, the optimal camera calculation unit 102 specifies the surveillance cameras 201 to 204 in which the angle $\theta_{c1}$ to $\theta_{c4}$ calculated in S604 is the smallest, as the surveillance camera 201 to 204 that can pick up a real video similar to the CG video.

Also, the optimal camera calculation unit 102 may specify the surveillance camera 201 to 204 on the basis of the degree of similarity between the CG image picked up by the virtual camera and the real videos picked up by the surveillance cameras 201 to 204.

Next, in S606, the optimal camera calculation unit 102 calculates optimal camera parameters. More specifically, the optimal camera calculation unit 102 calculates the pan angle $\theta_p$ and the tilt angle $\theta_t$ in the case where the specified surveillance camera 201 to 204 faces the direction of the point of interest 700, as optimal camera parameters. Also, the zoom magnification $f_z$ with which the size of the three-dimensional CG model 901 near the point of interest 700 in the case where the surveillance camera faces the point of interest 700 at the pan angle $\theta_p$ and the tilt angle $\theta_t$ that are calculated is equal to the size of the three-dimensional CG model 901 in the virtual camera, is calculated as an optimal camera parameter.

Here, S402 is equivalent to a CG video display step. S403, S601 are equivalent to an input step. S405 is equivalent to a movement step. S407, S602 to S606 are equivalent to a control step. S407 is equivalent to a real video display step.

Advantageous Effects of Embodiment 1

According to the remote monitoring system according to Embodiment 1 described above, since the surveillance camera 201 to 204 that can pick up the real video similar to the CG video after being moved is specified, the surveillance camera 201 to 204 that can pick up an image that the user wants to see can be easily selected.

Also, since the surveillance camera 201 to 204 that can pick up the real video similar to the CG video is specified from among the plurality of surveillance cameras 201 to 204, using the position of the virtual camera and the point of interest 700 that is set, the surveillance camera 201 to 204 that can pick up an image of the point of interest 700 can be easily selected.

Also, since the CG video after being moved on the basis of a user's input is adjusted using surveillance camera parameters available for the surveillance cameras 201 to 204 to pick up an image, the CG video can be made to coincide with the real video even in the case where the actual surveillance cameras 201 to 204 cannot pickup the real video that coincides with the generated CG video.

Moreover, since the display unit 401 displays the CG video as superimposed on the real video, the user can move the CG video while grasping the correlation with the real video.

Embodiment 2

Embodiment 2 is different from Embodiment 1 in that an input to select one surveillance camera 201 to 204 from the plurality of surveillance cameras 201 to 204 is accepted from the user, thus specifying the surveillance camera 201 to 204 to pick up the real video.

Hereinafter, Embodiment 2 of the invention will be described using FIG. 10.

FIG. 10 shows an outline of optimal camera parameter calculation processing in the case where a single virtual camera is provided in the remote monitoring system according to Embodiment 2 of the invention.

First, in S1001, the input unit 301 accepts an input of a surveillance camera ID to identify a surveillance camera 201 to 204.

Next, in S1002, the optimal camera calculation unit 102 specifies the surveillance camera 201 to 204 to pick up the real video, on the basis of the surveillance camera ID accepted as an input in S1001.

Next, in S1003, the real video picked up by the surveillance camera 201 to 204 specified in S1002 is displayed on the display unit 401.

Next, in S1004, the three-dimensional CG image generation unit 101 generates a CG video on the basis of virtual camera parameters having the same values as the surveillance camera installation data of the surveillance camera 201 to 204 and the three-dimensional CG model, and displays the generated CG video as superimposed on the real video.

Next, in S1005, the input unit 301 accepts an input to the CG video displayed on the display unit 401.

Next, in S1006, the virtual camera interactive setting unit 105 changes the [virtual camera direction] of the virtual camera parameters on the basis of the input accepted in S403. In Embodiment 2, the [virtual camera position], of the virtual camera parameters, is fixed to the same position as the [surveillance camera position] of the surveillance camera 201 to 204 specified in S1002. Subsequently, the virtual camera interactive setting unit 105 transmits the changed virtual camera parameter to the three-dimensional CG image generation unit 101.

Next, in S1007, the three-dimensional CG image generation unit 101 generates a CG video on the basis of the virtual camera parameter after being changed in S1006 and the three-dimensional CG model, and displays the CG video after being moved, as superimposed on the real video.

Next, in S1008, the optimal camera calculation unit 102 applies the virtual camera parameter after being changed in S1006 (that is, the [virtual camera direction]), as an optimal camera parameter to pick up a real video similar to the CG video picked up by the virtual camera. Then, the optimal camera calculation unit 102 transmits the optimal camera parameter to the camera control unit 103.

Finally, in S1009, the camera control unit 103 sets the pan angle $\theta_p$, the tilt angle $\theta_t$ and the zoom magnification $f_z$ using the optimal camera parameter, in the control unit 205 of the surveillance camera 201 to 204. The control unit 205 controls the surveillance camera 201 to 204 on the basis of the set values. Then, the surveillance camera 201 to 204 controlled by the control unit 205 picks up a real video, and the display unit 401 displays the real video picked up by the controlled surveillance camera 201 to 204 and also displays the CG video after being moved, as superimposed on this real video.

Even in the case where the input unit 301 accepts the surveillance camera ID of the surveillance camera 201 to 204, as described above, a user interface without having a fixed virtual camera position 800 of the virtual camera is conceivable. In this case, an input to set a point of interest 700 may be accepted and optimal camera parameters of the specified surveillance camera 201 to 204 may be set using the set point of interest 700.

Here, S1001 is equivalent to a designation step. S1008, S1009 are equivalent to a control step.

Advantageous Effects of Embodiment 2

According to the remote monitoring system according to Embodiment 2 described above, since the designated surveillance camera 201 to 204 is controlled to pick up the real video similar to the CG video, the display of the real video can be made to follow the CG video without designating a point of interest 700, in addition to the advantageous effects of Embodiment 1.

While the invention made by the present inventor is specifically described above on the basis of the embodiments, it is a matter of course that the invention is not limited to the embodiments and that various changes can be made without departing from the scope of the invention.

REFERENCE SIGNS LIST

100 remote monitoring system control unit
101 three-dimensional CG image generation unit 102 optimal camera calculation unit
103 camera control unit
104 image input unit
105 virtual camera interactive setting unit
106 target CG model storage unit
107 surveillance camera installation data storage unit
201, 202, 203, 204 surveillance camera
205 control unit
301 input unit
401 display unit
700 point of interest
800 virtual camera position
901 three-dimensional CG model
902, 903, 904, 905, 906 straight line.

The invention claimed is:

1. A remote monitoring system comprising:
a display unit on which a Computer Graphic (CG) video generated from a three-dimensional CG model is displayed;
an input unit which accepts a user's input to the CG video;
a three-dimensional CU image generation unit which displays, on the display unit, the CG video after being moved based on the input;
an optimal camera calculation unit which specifies a surveillance camera that can pick up a real video similar to the CU video after being moved; and
a control unit which controls the surveillance camera;
wherein a real video picked up by the surveillance camera is displayed on the display unit; and
wherein the input unit accepts an input to set a point of interest, and, when the point of interest is a center point of a two-dimensional image, a coordinate in a depth direction of an outermost surface of an object displayed in the two-dimensional image is used as a coordinate in the depth direction of the point of interest.

2. The remote monitoring system according to claim 1, wherein
the optimal camera calculation unit specifies the surveillance camera that can pick up the real video similar to the CG video, from a plurality of surveillance cameras, using a position of a virtual camera and the point of interest that is set.

3. The remote monitoring system according to claim 1, wherein
the input unit accepts an input to designate one of the plurality of surveillance cameras, and
the control unit controls the surveillance camera that is designated, and thereby causing the real video similar to the CG video to be picked up.

4. The remote monitoring system according to claim 1, wherein
the CG video, after being moved based on the user's input, is adjusted by changing a surveillance camera parameter available for the surveillance camera to pick up an image.

5. The remote monitoring system according to claim 1, wherein
on the display unit, the CG video is displayed as superimposed on the real video.

6. A monitoring method comprising:
a CG video display step of displaying a CG video generated from a three-dimensional CG model;
an input step of accepting a user's input to the CG video;
a movement step of moving the CG video based on the input accepted from the user;
a control step of specifying a surveillance camera that can pick up a real video similar to the CG video after being moved, and controlling the surveillance camera; and
a real video display step of displaying the real video picked up by the surveillance camera;
wherein the input unit accepts an input to set a point of interest, and, when the point of interest is a center point of a two-dimensional image, a coordinate in a depth direction of an outermost surface of an object displayed in the two-dimensional image is used as a coordinate in the depth direction of the point of interest.

7. The monitoring method according to claim 6, wherein
in the control step, the surveillance camera that can pick up the real video similar to the CG video is specified from a plurality of surveillance cameras, using a position of a virtual camera and information of the point of interest, and the specified surveillance camera is controlled.

8. The monitoring method according to claim 6, further comprising
a designation step of designating one of the plurality of surveillance cameras, wherein
in the control step, the surveillance camera that is designated is controlled, thereby causing the real video similar to the CG video to be picked up.

9. The monitoring method according to claim 6, wherein
in the movement step, the CG video, after being moved, is adjusted by changing a camera parameter available for the surveillance camera to pick up an image after the user input is completed.

10. The monitoring method according to claim 6, wherein
in the CG video display step, the CG video is displayed as superimposed on the real video.

* * * * *